United States Patent [19]

Takahashi et al.

[11] Patent Number: 4,789,963

[45] Date of Patent: Dec. 6, 1988

[54] DISPLAY CONTROL APPARATUS FOR CONTROLLING TO WRITE IMAGE DATA TO A PLURALITY OF MEMORY PLANES

[75] Inventors: Hitoshi Takahashi; Kiminori Fujisaku, both of Tokyo, Japan

[73] Assignee: Fujitsu Limited, Kawasaki, Japan

[21] Appl. No.: 63,754

[22] Filed: Jun. 16, 1987

Related U.S. Application Data

[63] Continuation of Ser. No. 650,547, Sep. 14, 1984.

[30] Foreign Application Priority Data

Sep. 21, 1983 [JP] Japan ............................... 58-174486

[51] Int. Cl.$^4$ ............................................. G06F 15/66

[52] U.S. Cl. ..................................... 364/900; 364/518; 364/521

[58] Field of Search ....... 364/200 MS FILE, 900 MS FILE, 364/518, 521, 522

[56] References Cited

U.S. PATENT DOCUMENTS

| | | | |
|---|---|---|---|
| 3,978,470 | 8/1976 | McGuire | 340/799 |
| 4,016,544 | 4/1977 | Morita | 364/900 |
| 4,094,000 | 6/1978 | Brudevald | 364/900 |
| 4,424,572 | 1/1984 | Lorig | 364/900 |
| 4,484,187 | 11/1984 | Brown | 340/703 |
| 4,490,797 | 12/1984 | Staggs et al. | 364/522 |
| 4,509,043 | 4/1985 | Mossaides | 340/729 |
| 4,598,384 | 7/1986 | Shaw et al. | 364/900 |

FOREIGN PATENT DOCUMENTS 0105724 4/1984 European Pat. Off. .

OTHER PUBLICATIONS

EPC Search Report EP 84306458.

*Primary Examiner*—Raulfe B. Zache
*Assistant Examiner*—Emily Y. Chan
*Attorney, Agent, or Firm*—Staas & Halsey

[57] ABSTRACT

A method for controlling a plurality of memory planes in a writing operation in a display control apparatus of a graphic system, the method including the steps of selectively connecting a plurality of the memory planes to a data bus by using an interface unit; selectively applying a write enable signal to the memory planes from a plane designating unit; applying data to be written to the data bus from a central processing unit; writing the data into the memory planes to which the write enable signal has been applied and which are connected to the data bus; and writing predetermined fixed data into the memory planes to which is the write enable signal has been applied but which are not connected to the data bus.

9 Claims, 9 Drawing Sheets

DISPLAY CONTROL APPARATUS FOR CONTROLLING TO WRITE IMAGE DATA TO A PLURALITY OF MEMORY PLANES

This is a continuation of co-pending application Ser. No. 650,547 filed on Sept. 14, 1984.

BACKGROUND OF THE INVENTION

1. Field of the Invention

The present invention relates to a display control apparatus, more particularly to a method and apparatus for controlling a plurality of memory planes in a writing operation in a display control apparatus of a graphic system of a personal computer. With the present invention, it is possible to simultaneously write different data on a data bus into a plurality of memory planes, for example, three memory planes storing tricolor data, i.e., red (R), green (G), and blue (B) data. With such a system, a color image displayed on a color cathode ray tube (CRT) can be quickly changed to another desired color.

2. Description of the Prior Art

Popularization of personal computers in various different fields has recently led to use of various graphic systems as input/output devices. In many cases, a color CRT is used as the graphic system. As is well known by persons skilled in the art, a color image on a CRT consists of by R, G, and B dots. The color image is changed by reading from and writing into memory planes storing tricolor data. When changing the color, i.e., when changing a displayed color image to another color, the selection of the memory planes and the change of logic in the selected memory planes must be sequentially performed. As a result, it is not possible to increase the speed of processing (change) of the color image displayed on the CRT.

SUMMARY OF THE INVENTION

An object of the present invention is to provide a display control apparatus for a graphic system in a personal computer.

Another object of the present invention is to provide a method and apparatus for controlling memory planes in a writing operation in a display control apparatus.

Still another object of the present invention is to increase the speed of processing of a color image by an improved method and apparatus for controlling memory planes in a writing operation.

In accordance with the present invention, there is provided a method for controlling a plurality of memory planes in a writing operation in a display control apparatus of a graphic system, the method includes the steps of selectively connecting a plurality of the memory planes to a data bus by using an interface unit; selectively applying a write enable signal to the memory planes from a plane designating unit; applying data to be written to the data bus from a central processing unit (CPU); writing the data into the memory planes to which the write enable signal has been applied and which are connected to the data bus; and writing predetermined fixed data into the memory planes to which the write enable signal has been applied but which are not connected to the data bus.

Further, there is provided an apparatus for controlling a plurality of memory planes in a writing operation in a display control apparatus of a graphic system, the apparatus including: a plurality of memory planes for storing color image data using the same address signal transmitted from a CPU; a plurality of plane designating units corresponding to the memory planes for selectively applying a write enable signal to the memory planes; a plurality of interface units corresponding to the memory planes for selectively connecting the memory planes to a corresponding data bus; and a plurality of interface control units for controlling the turning on or off of the corresponding interface units. The plurality of memory planes are simultaneously set to a write enable state by the write enable signal transmitted from the corresponding plane designating unit. When the write data is written into one or more memory planes, the other memory planes are disconnected from the interface units and have written therein predetermined fixed data transmitted from the interface units.

In accordance with the structure of the present invention, it is possible to simultaneously write different data into a plurality of memory planes, thereby enabling quick processing or changing of a color image displayed on a CRT into another desired color image.

DESCRIPTION OF THE PREFERRED EMBODIMENTS

Before describing the preferred embodiments, an explanation will be given of a conventional method and apparatus for controlling memory planes in a writing operation in a display control apparatus.

Figure 1:
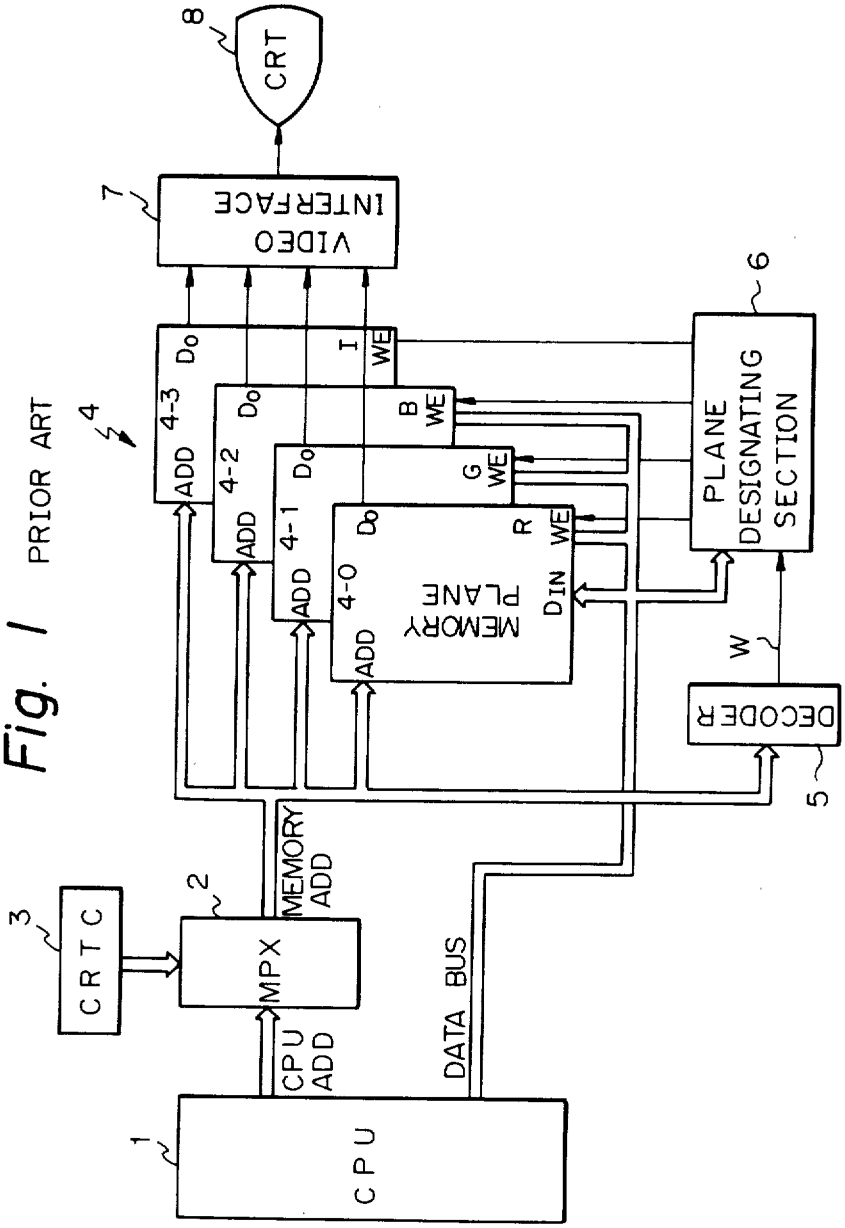
Fig. 1 PRIOR ART
FIG. 1 is a schematic block diagram of a conventional apparatus.

Referring to FIG. 1, an apparatus for controlling writing into memory planes or graphic memories basically includes a CPU 1 for commanding reading/writing into or from memory planes 4-0 to 4-3, and a multiplexer (MPX) 2 for controlling the change between a CPU address signal transmitted from the CPU 1 and a scanning address signal transmitted from a CRT controller 3. The CRT controller 3 is for generating a scanning address signal for displaying the image data on a CRT 8, while the memory planes 4-0 to 4-3 are for storing tricolor data, i.e., red (R), green (G), and blue (B), and intensity (I) data therein, the memory planes 4-0 to 4-3 being operatively connected to the CPU 1 in parallel via a data bus. Also included is a plane designating unit 6 for designating any of the memory planes 4 based on a writing designating signal transmitted from the CPU 1.

A common address is designated for the same coordinate in each memory plane 4-0 to 4-3. Therefore, the CPU 1 can access each memory plane 4-0 to 4-3 by using the common address. In reading, red (R), green (G), and blue (B) are simultaneously read out from each plane, and the read-out data is displayed on the CRT 8.

In writing, assuming that logic "0" is stored in the memory plane 4-0 (R memory) and the memory plane 4-1 (G memory) and that logic "1" is stored in the memory plane 4-2 (B memory) so that a blue color is shown on the CRT 8, to change from blue to yellow, since yellow is constituted by red and green, both logics "0" on the R and G memories must be changed to logic "1" and the logic "1" on the B memory must be changed to logic "0".

In the conventional prior art procedure, first the B memory is selected by the plane designating unit 6 based on the writing designating signal W transmitted from the MPX 2 via the decoder 5. Next, the logic "1" on the B memory is changed to logic "0". The R and G memories are then selected by the plane designating unit 6 and, then, the logics "1" on the R and G memories are changed to logic "0". The selection of the memory planes and the change of logic on the selected memory planes must be sequentially performed. As a result, complex steps are necessary to process the color image displayed on the CRT. This prevents the processing speed from being increased when using conventional processing procedures.

The method and apparatus for controlling memory planes in a writing operation according to an embodiment of the present invention will now be explained.

Figure 2A:
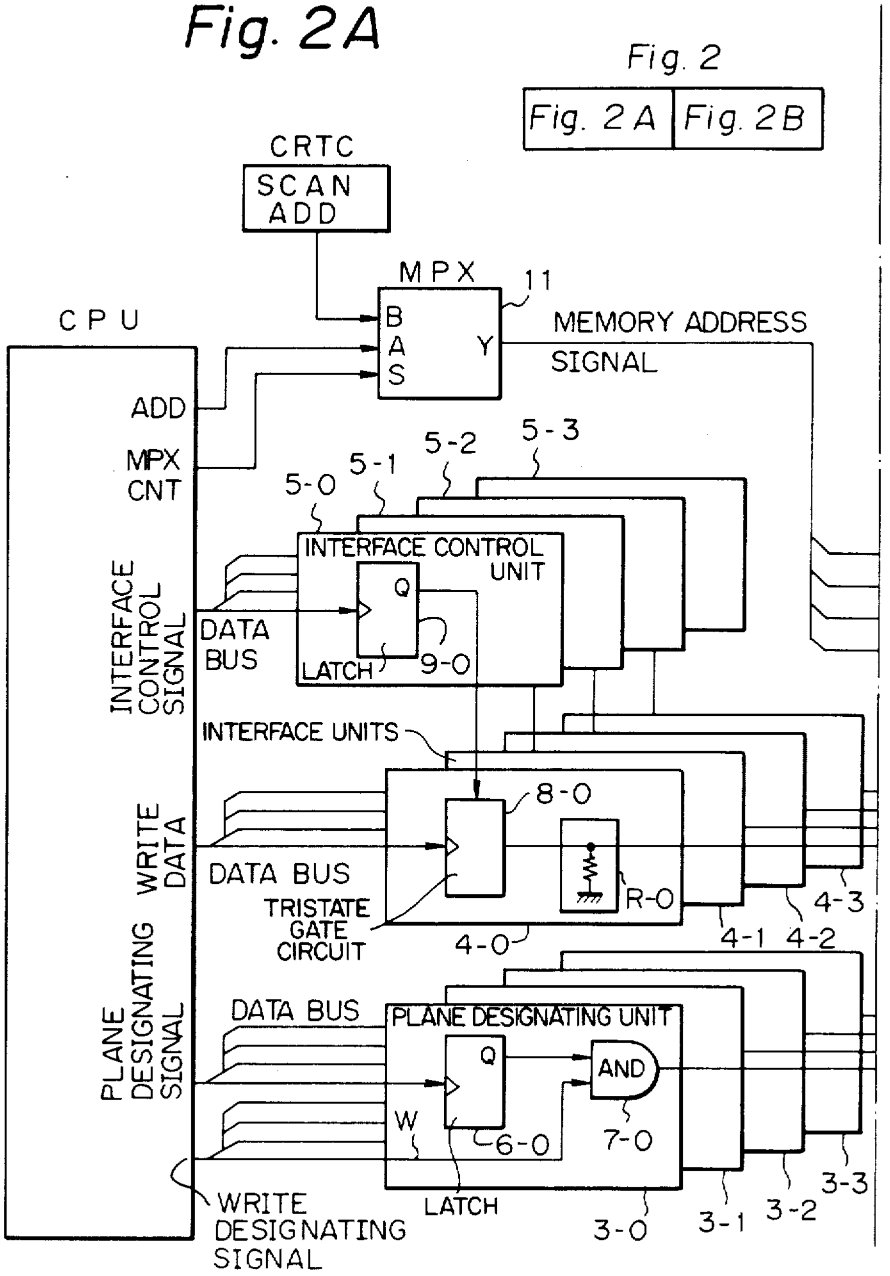
FIGS. 2A and 2B are basic block diagrams of an apparatus according to an embodiment of the present invention.
Figure 2B:
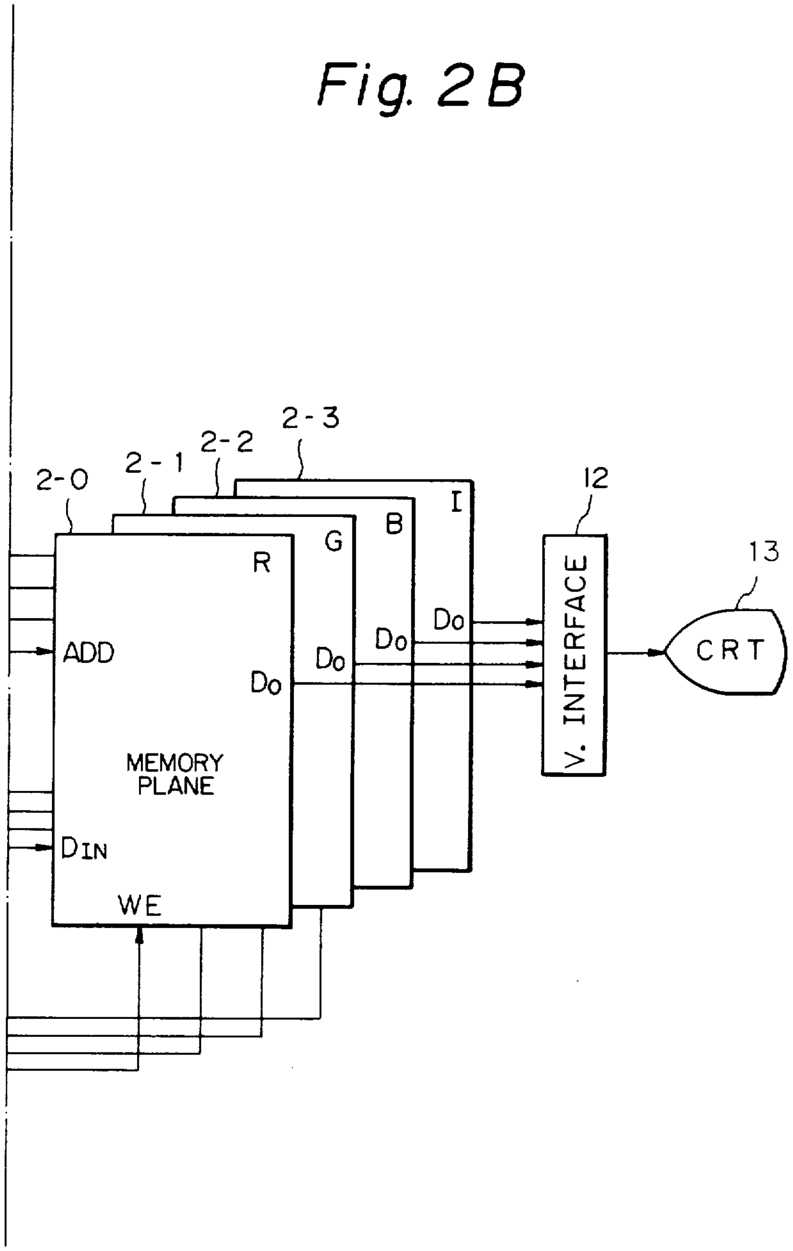

Referring to FIGS. 2A and 2B, an apparatus for controlling memory planes according to an embodiment of the present invention basically includes a CPU 1; memory planes or graphic memories 2-0 to 2-3; plane designating units 3-0 to 3-3, each having latch circuits 6-0 to 6-3 and AND gate circuits 7-0 to 7-3; interface units 4-0 to 4-3, each having tristate gate circuits 8-0 to 8-3 and pull-down resistances R-0 to R-3; interface control units 5-0 to 5-3, each having latch circuits 9-0 to 9-3; a multiplexer 11; a video interface circuit 12; and a color CRT 13. Each memory plane 2 and plane designating unit 3 are connected in series to the CPU 1 via a data bus. Each memory plane 2 and interface unit 4 are also connected in series to the CPU 1 via the data bus. Moreover, each interface control unit 5 is connected between an interface unit 4 and the CPU 1 via the data bus.

The plane designating unit 3-0 comprises a plane designating flip-flop circuit used as the latch circuit 6-0 and the AND gate circuit 7-0. When the write designating signal W is applied to the AND gate circuit 7-0 after the latch circuit 6-0 is set by the plane designating signal transmited from the CPU 1, the memory plane 2-0 is set in the write enable state by a write enable signal WE transmitted from the AND gate circuit 7-0. The other plane designating units 3-1 to 3-3 have the same construction and operation. Accordingly, the CPU 1 can simultaneously and selectively set any one or more memory planes in the write enable state.

The interface unit 4-0 includes the tristate gate circuit 8-0 for use in writing, along with pull-down resistances R-0 to R-3. When the tristate gate circuit 8-0 is on, the writing data transmitted from the CPU 1 is transferred to the memory plane 2-0. When the tristate gate circuit 8-0 is off, other writing data having logic "0" transmitted from the pull-down resistance R-0 is transferred to the memory plane 2-0. The other interface units 4-1 to 4-3 have the same construction and operation.

The interface control unit 5-0 includes a flip-flop circuit used as the latch circuit 9-0 for controlling the tristate gate circuit 8-0 in writing. When the latch circuit 9-0 is placed in the "set" or "reset" state in accordance with an interface control signal transmitted from the CPU 1, the tristate gate circuit 8-0 is turned on or off in accordance with the "set" or "reset" state of the latch circuit 9-0. The other interface control units 5-1 to 5-3 have the same construction and operation.

To change from blue to yellow on the CRT 8, first, each memory plane 2-0, 2-1, and 2-2 (R, G, and B memory) is placed in the write enable state based on the write enable signals WE corresponding to the plane designating units 3-0, 3-1, and 3-2. At this time, the latch circuits 6-0, 6-1, and 6-2 are placed in the "set" state based on the write designating signal W transmitted from the CPU 1. Next, the tristate gate circuits 8-0 and 8-1 corresponding to the interface control units 5-0 and 5-1 are placed in the on state, and the tristate gate circuit 8-2 corresponding to the interface control unit 5-2 is placed in the off state. Finally, the writing data for writing logic "1" and the write designating signal W are simultaneously applied to the R and G memories from the CPU 1, and logic "0" is applied to the B memory from the pull-down resistance R-2. By the above procedure, logic "0" on the R and G memories can be changed to logic "1", and logic "1" on the B memory can be changed to logic "0". Incidentally, to facilitate the above explanation, the memory plane 2-3, which stores intensity data has not been discussed.

Figure 3A:
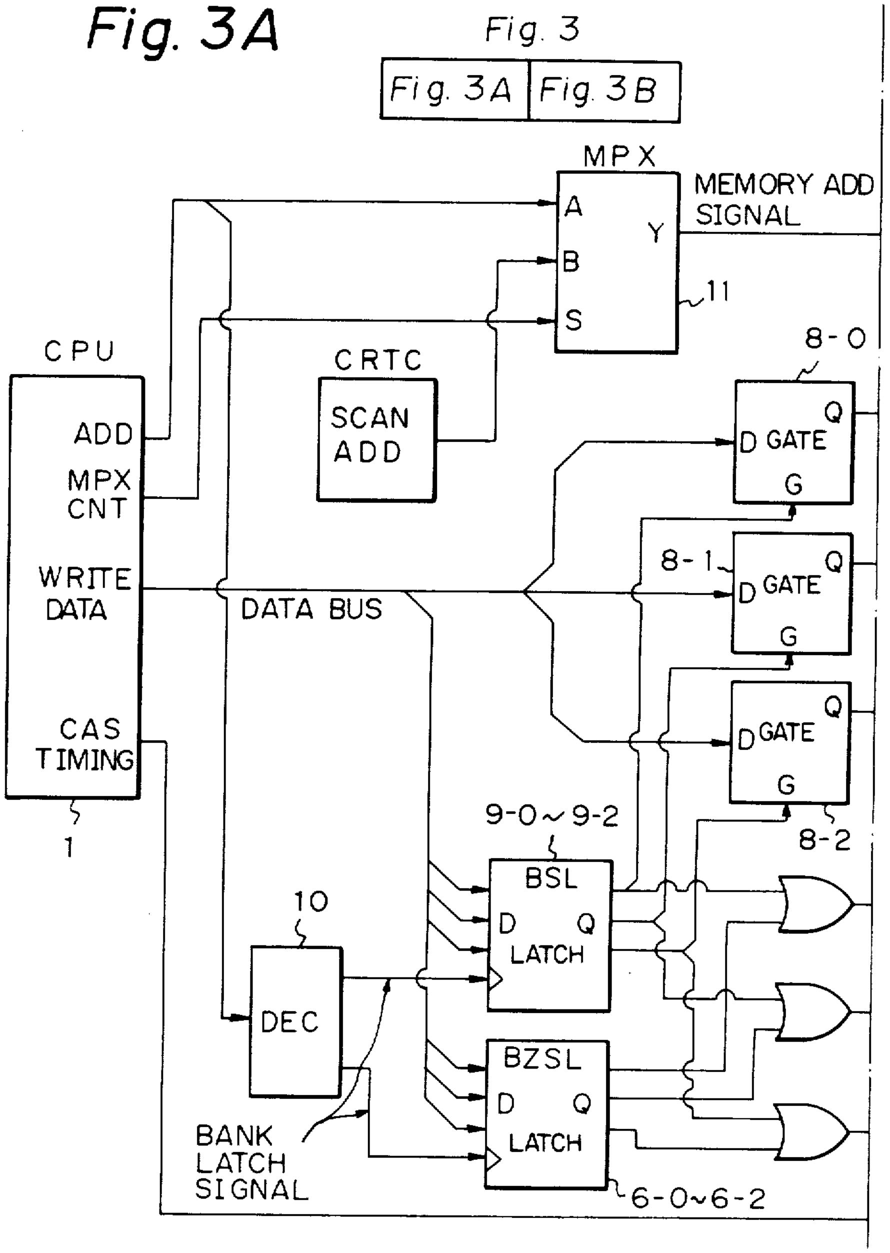
FIGS. 3A and 3B are detailed block diagrams of the apparatus shown in FIGS. 2A and 2B.
Figure 3B:
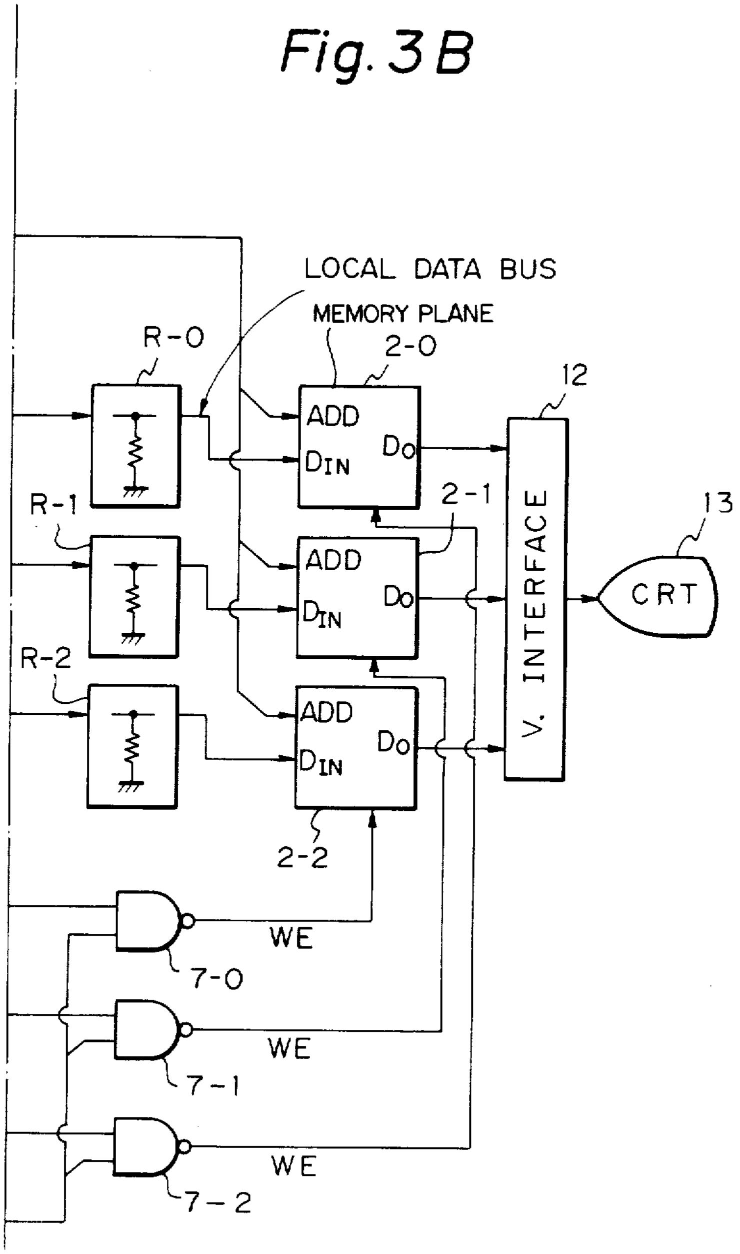

FIGS. 3A and 3B are detailed block diagrams of the apparatus shown in FIGS. 2A and 2B. As above, since the memory plane 2-3 is used only for brightness control of the CRT 13, a discussion thereof is omitted to facilitate the explanation of the circuit operations. Each memory plane 2-0 to 2-2 comprises a 64K dynamic random access memory (DRAM). Writing data of 8 bits per word is applied to each input $D_{IN}$. A common memory address signal transmitted from the multiplexer 11 is simultaneously applied to each input ADD. Each output data $D_O$ is applied to the CRT 13 via the video interface circuit 12. Each tristate gate circuit 8-0 to 8-2 functions as a so-called one-way tristate logic. That is, each gate fundamentally has three states, i.e., a first or second state of logic "1" or logic "0" and of low output impedance and a third state of logic "0" and of high output impedance. The on or off state of each tristate gate circuit is controlled by bank selection latches BSL used as the latch circuits 9-0 to 9-2 provided to each interface control unit 5-0 to 5-2 shown in FIG. 2A. When any one or two tristate gate circuits are set to the first or second state, i.e., the on state, writing data of logic "1" or "0" transmitted from the CPU 1 via the data bus can be written into the corresponding memory planes. In this case, the other one or two tristate gate circuits which were not set to the first or second state are set to the third state, i.e., the off state. A tristate gate circuit which is set in the third state cannot transfer the writing data to the corresponding memory plane. However, logic "0" is transferred as the writing data by the corresponding pull-down resistance R-0, R-1, or R-2 to the corresponding memory plane via a local data bus instead of the writing data transmitted from the CPU 1 via the data bus. As explained in FIGS. 2A and 2B, if the tristate gate circuits 8-0 and 8-1 are on and the tristate gate circuit 8-2 is off, the writing data of logic "1" can be written into the corresponding R and G memories, and the other writing data of logic "0" can be written into the corresponding B memory. Accordingly, when a plane designating unit is placed in the write enable state based on the write designating signal, if the tristate gate circuit is placed in the on state, the writing data of logic "1" can be written into the corresponding memory plane, while if the tristate gate circuit is set to the off state, the other writing data of logic "0" (namely, fixed data of logic "0") can be written into the other corresponding memory plane.

Figure 4A:
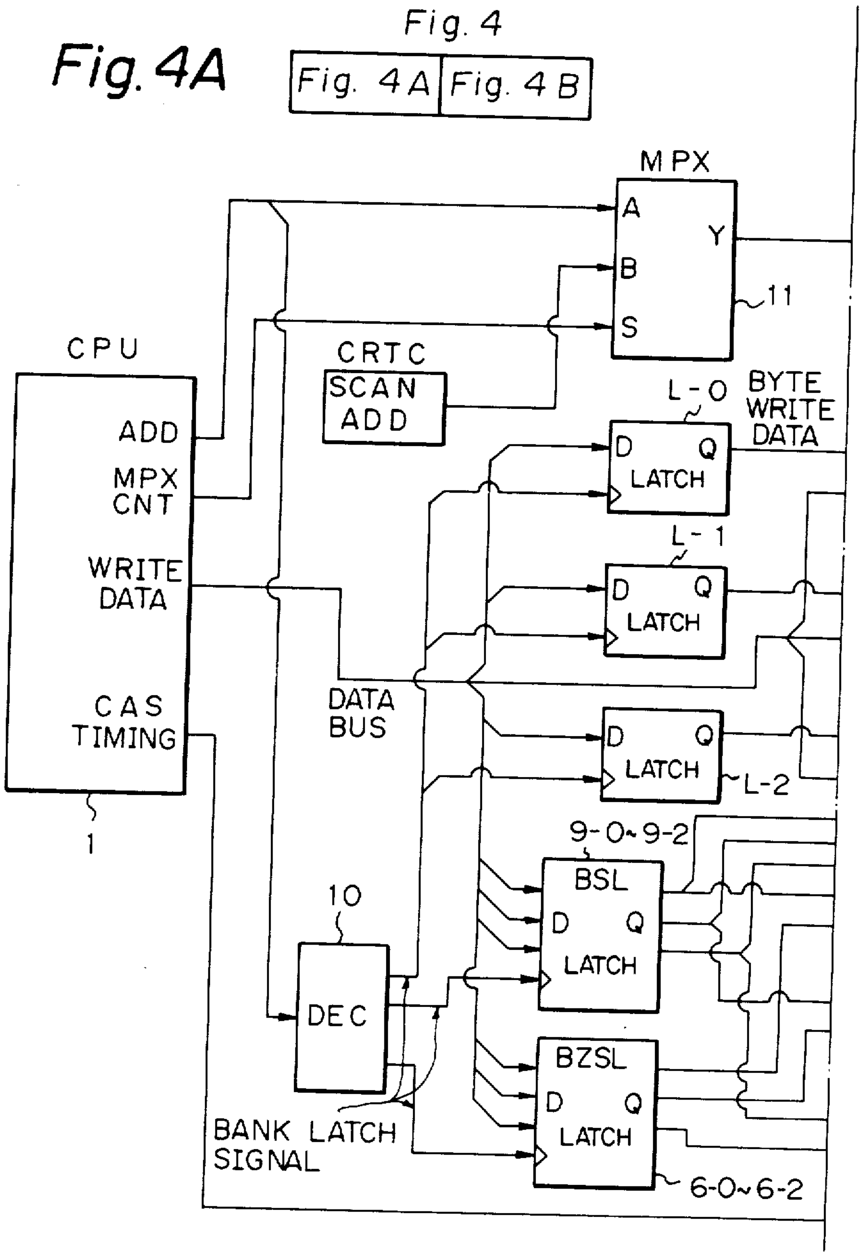
FIGS. 4A and 4B are detailed block diagrams of another embodiment of the apparatus shown in FIGS. 3A and 3B.
Figure 4B:
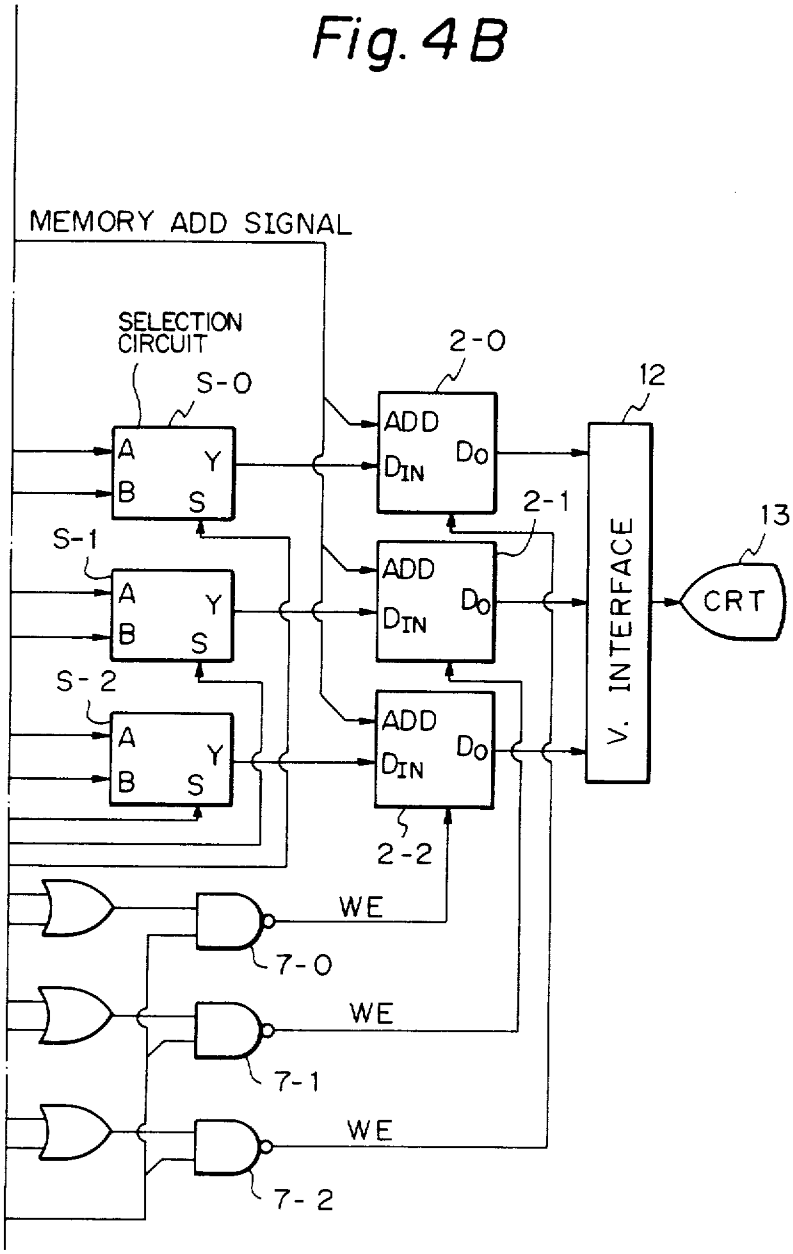

FIGS. 4A and 4B are detailed block diagrams of another embodiment of the apparatus shown in FIGS. 3A and 3B. Referring to FIGS. 4A and 4B, selection circuits S-0 to S-2 and latch circuits L-0 to L-2 are provided between the CPU 1 and memory planes 2-0 to 2-2 instead of tristate gate circuits 8-0 to 8-2 and pull-down resistances R-0 to R-2 shown in FIG. 3B. Byte write data transmitted from each latch circuit is applied to the input A of each selection circuit. Writing data transmitted from the CPU via a data bus is applied to the input B of each selection circuit. These inputs are selected by each selection circuit based on the high or low selection signal applied to the input S transmitted from each interface control unit 9-0 to 9-2. Output data Y of each selection circuit is applied to the input $D_{IN}$ of each memory plane. Accordingly, either the byte write data or writing data which is selected by the selection circuit based on the logic "1" or logic "0" signal transmitted from the interface control unit is applied from the output Y to the corresponding memory plane. When the tristate gate circuit is off, although only logic "0" is applied to the corresponding memory plane as explained in FIGS. 3A and 3B, in this embodiment, the logic "1" or "0" of the byte write data transmitted from the latch circuit can be compulsorily selected by switching the selection circuit based on the high or low selection signal transmitted from the interface control circuit.

Figure 5:
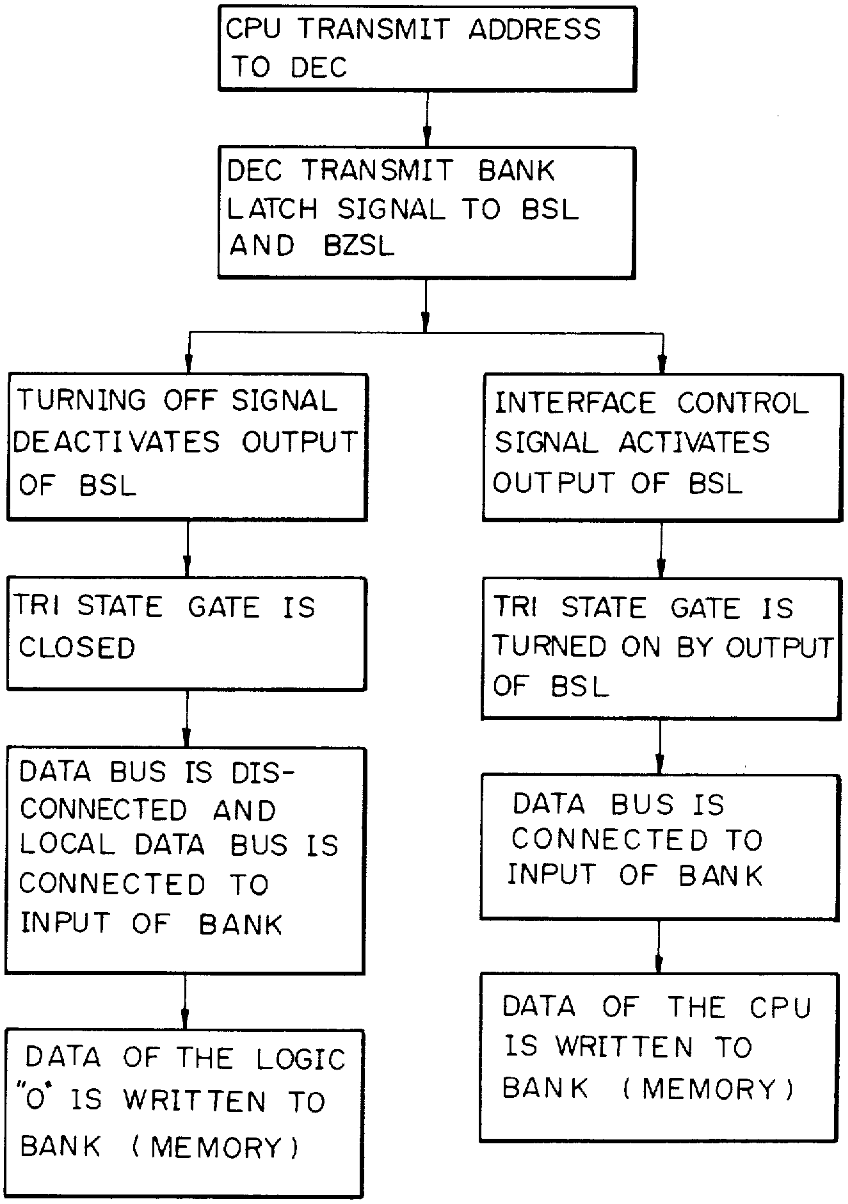
FIG. 5 is a flow chart of the processing procedure of the apparatus shown in FIGS. 3A and 3B.

FIG. 5 is a flow chart of the processing procedure of the apparatus shown in FIGS. 3A and 3B. Referring to FIG. 5, first, the CPU 1 transmits an address signal to an address decoder 10. The decoder 10 designates a common address for each bank selection latch circuit 9-0 to 9-2 of each interface control unit 5-0 to 5-2 and to each byte zero selection latch circuit BZSL 6-0 to 6-2 of each plane designating unit 3-0 to 3-2.

When writing the data on the CPU data bus into the DRAM's , the outputs of the bank selection latch circuits corresponding to the banks (memory plane) requested to write the writing data from the CPU are activated by an interface control signal. The corresponding tristate gate circuits are turned on by the outputs transmitted from the bank selection latch circuits. The data bus of the CPU is connected to the inputs $D_{IN}$ of the corresponding banks (DRAM, memory plane). The outputs of the byte zero selection latch circuits corresponding to the banks not requested to write the writing data from the CPU are deactivated by the turning off signal. The write enable signal to the banks not requested to be written is deactivated by this procedure. When the CPU transmits the writing data to the corresponding DRAM's , the data on the CPU data bus can be written into the corresponding address of the DRAM's .

When writing data "0" by byte zero selection, the outputs of the bank selection latch circuits corresponding to the banks requested to write the byte zero are deactivated by the turning off signal. The tristate gate circuits corresponding to the banks requested to write byte zero are closed. The data bus of the CPU is disconnected from the inputs $D_{IN}$ of the corresponding banks, therefore the inputs $D_{IN}$ become equivalent to the ground connected by a pull-down resistance. Meanwhile, the outputs of the byte zero selection latch circuits corresponding to the banks requested to write the byte zero are activated, whereby the write enable signal can be transmitted to the nonselected banks by the bank selection latch circuits.

When the CPU transmits the writing operation corresponding into the DRAM's , logic "0" of the local data bus is written to the corresponding address in the banks (memory plane).

Figure 6:
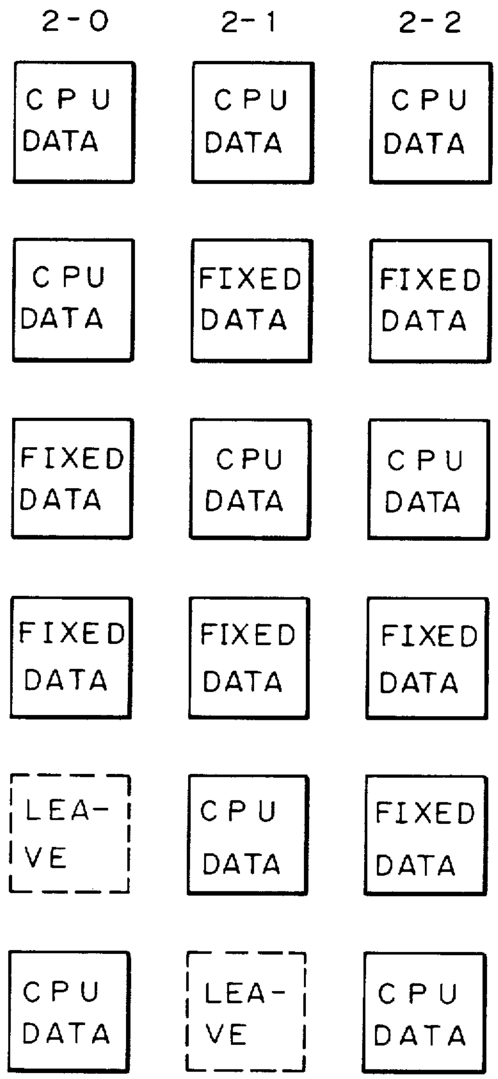
FIG. 6 is a view of various modes of memory planes shown in FIGS. 3A and 3B.

FIG. 6 illustrates various modes of memory planes 2-0 to 2-2. Referring to FIG. 6, "CPU DATA" indicates the writing data of logic "1" transmitted from the CPU, "FIXED DATA" indicates the writing data of logic "0" transmitted from the pull-down resistance, and "LEAVE" indicates no change of stored data in the memory planes.

For example, when all memory planes are written by "CPU DATA", i.e., logic "1", a white color is displayed because the R, G, and B memories are all logic "1". Meanwhile, when all the memory planes are written by "FIXED DATA", i.e., logic "0", a black color is displayed because the R, G, and B memories are all logic "0".

We claim:

1. An apparatus for controlling a plurality of memory planes during a writing operation for a display control apparatus of a graphic system having a common data bus carrying data from a central processing unit producing a write designating signal and a plane designating signal, said apparatus comprising:

a plurality of memory planes for storing color image data using a single address signal transmitted from the central processing unit;

a plurality of plane designating units, corresponding and connected to said memory planes, for selectively applying a write enable signal to all said memory planes in dependence on the write designating signal and the plane designating signal, each plane designating unit comprising gate means for receiving the plane designating signal and the write designating signal and when both the plane designating signal and the write designating signal are received said gate means outputs the write enable signal;

a plurality of interface units, corresponding and connected to said memory planes and the common data bus, for selectively connecting said memory planes to the common data bus to write said color image data therein;

a plurality of interface control units, corresponding and connected to said interface units, for controlling the turning on or off of the corresponding interface units;

predetermined data means, connected to at least one memory plane disconnected from said common data bus, for applying, to the at least one memory plane disconnected from said common data bus, predetermined data which is inverted compared to said color image data written into said memory plane connected to said common data bus; and the at least one memory plane connected to said common data bus and the at least one memory plane disconnected from said common data bus being set to a write enable state by the write enable signal transmitted from a corresponding plane designating unit and when said color image data from said common data bus is written into the at least one connected memory plane, the at least one memory plane disconnected from said common data bus having written therein simultaneously the predetermined data transmitted from said predetermined data means.

2. An apparatus as claimed in claim 1, wherein said memory planes comprise four memory planes, three for storing color data and one for storing intensity data.

3. An apparatus as claimed in claim 1, wherein the central processing unit is connected to said plane designating units through the common data bus, and wherein said memory planes and said plane designating units are connected in series to said central processing unit.

4. An apparatus as claimed in claim 1, wherein the central processing unit is connected to said interface units through the common data bus, and wherein said memory planes and said interface units are connected in series to said central processing unit.

5. An apparatus as claimed in claim 1, wherein the central processing unit is connected to said interface control units through the common data bus, and said interface control units are each connected between said interface units and said central processing unit.

6. An apparatus for controlling a plurality of memory planes during a writing operation for a display control apparatus of a graphic system having a common data bus carrying data from a central processing unit producing a write designating signal and a plane designating signal, said apparatus comprising:

a plurality of memory planes for storing color image data using a single address signal transmitted from the central processing unit;

a plurality of plane designating units, corresponding and connected to said memory planes, for selectively applying a write enable signal to all said memory planes in dependence on the write designating signal and the plane designating signal;

a plurality of interface units, corresponding and connected to said memory planes and the common data bus, for selectively connecting said memory planes to the common data bus to write said color image data therein:

a plurality of interface control units, corresponding and connected to said interface units, for controlling the turning on or off of the corresponding interface units;

predetermined data means, connected to at least one memory plane disconnected from said common data bus, for applying, to the at least one memory plane disconnected from said common data bus, predetermined data which is inverted compared to said color image data written into said memory plane connected to said common data bus; and the at least one memory plane connected to said common data bus and the at least one memory plane disconnected from said common data bus being set to a write enable state by the write enable signal transmitted from a corresponding plane designating unit and when said color image data from said common data bus is written into the at least one connected memory plane, the at least one memory plane disconnected from said common data bus having written therein simultaneously the predetermined data transmitted from said predetermined data means; and said plane designating units each comprising:

a plane designating flip-flop circuit, connected to the common data bus, for storing the plane designating signal; and an AND gate circuit, connected to said flip-flop and the corresponding memory plane, for generating said write enable signal.

7. An apparatus as claimed in claim 1, wherein said interface units each comprise a tristate gate circuit, connected to the common data bus, for turning on or off said write data.

8. An apparatus as claimed in claim 7, wherein said predetermined data means comprises a pull-down resistance.

9. An apparatus for controlling a plurality of memory planes during a writing operation for a display control apparatus of a graphic system having a common data bus carrying data from a central processing unit producing a write designating signal and a plane designating signal, said apparatus comprising:

a plurality of memory planes for storing color image data using a single address signal transmitted from the central processing unit;

a plurality of plane designating units, corresponding and connected to said memory planes, for selectively applying a write enable signal to all said memory planes in dependence on the write designating signal and the plane designating signal;

a plurality of interface units, corresponding and connected to said memory planes and the common data bus, for selectively connecting said memory planes to the common data bus to write said color image data therein;

a plurality of interface control units, corresponding and connected to said interface units, for controlling the turning on or off of the corresponding interface units;

predetermined data means, connected to at least one memory plane disconnected from said common data bus, for applying, to the at least one memory plane disconnected from said common data bus, predetermined data which is inverted compared to said color image data written into said memory plane connected to said common data bus; and the at least one memory plane connected to said common data bus and the at least one memory plane disconnected from said common data bus being set to a write enable state by the write enable signal transmitted from a corresponding plane designating unit and when said color image data from said common data bus is written into the at least one connected memory plane, the at least one memory plane disconnected from said common data bus having written therein simultaneously the predetermined data transmitted from said predetermined data means; and said interface control units each comprising a flip-flop circuit, connected to the common data bus the corresponding interface unit, for storing an interface control signal for controlling the turning on or off of the corresponding interface unit.

* * * * *

UNITED STATES PATENT AND TRADEMARK OFFICE
CERTIFICATE OF CORRECTION

PATENT NO. : 4,789,963

DATED : December 6, 1988

INVENTOR(S) : Hitoshi Takahashi et al

It is certified that error appears in the above-identified patent and that said Letters Patent is hereby corrected as shown below:

FRONT PAGE, [56], line 4, "Morita" should be --Morita et al.--;
line 5, "Brudevald" should be --Brudevold--;
line 6, "Lorig" should be --Lorig et al.--;
line 7, "Brown" should be --Brown et al.--.

Col 6, line 7, "to" should be --into--.

Col. 8, line 60, "bus the" should be --bus and the--.

Col.6, line 6, "into" should read --to--.

Signed and Sealed this

Fifteenth Day of August, 1989

*Attest:*

DONALD J. QUIGG

*Attesting Officer*

*Commissioner of Patents and Trademarks*